W. J. McVICKER.
VALVE GEAR FOR EXPLOSIVE ENGINES.
APPLICATION FILED JAN. 25, 1905.
Reissued Apr. 5, 1910.
13,099.
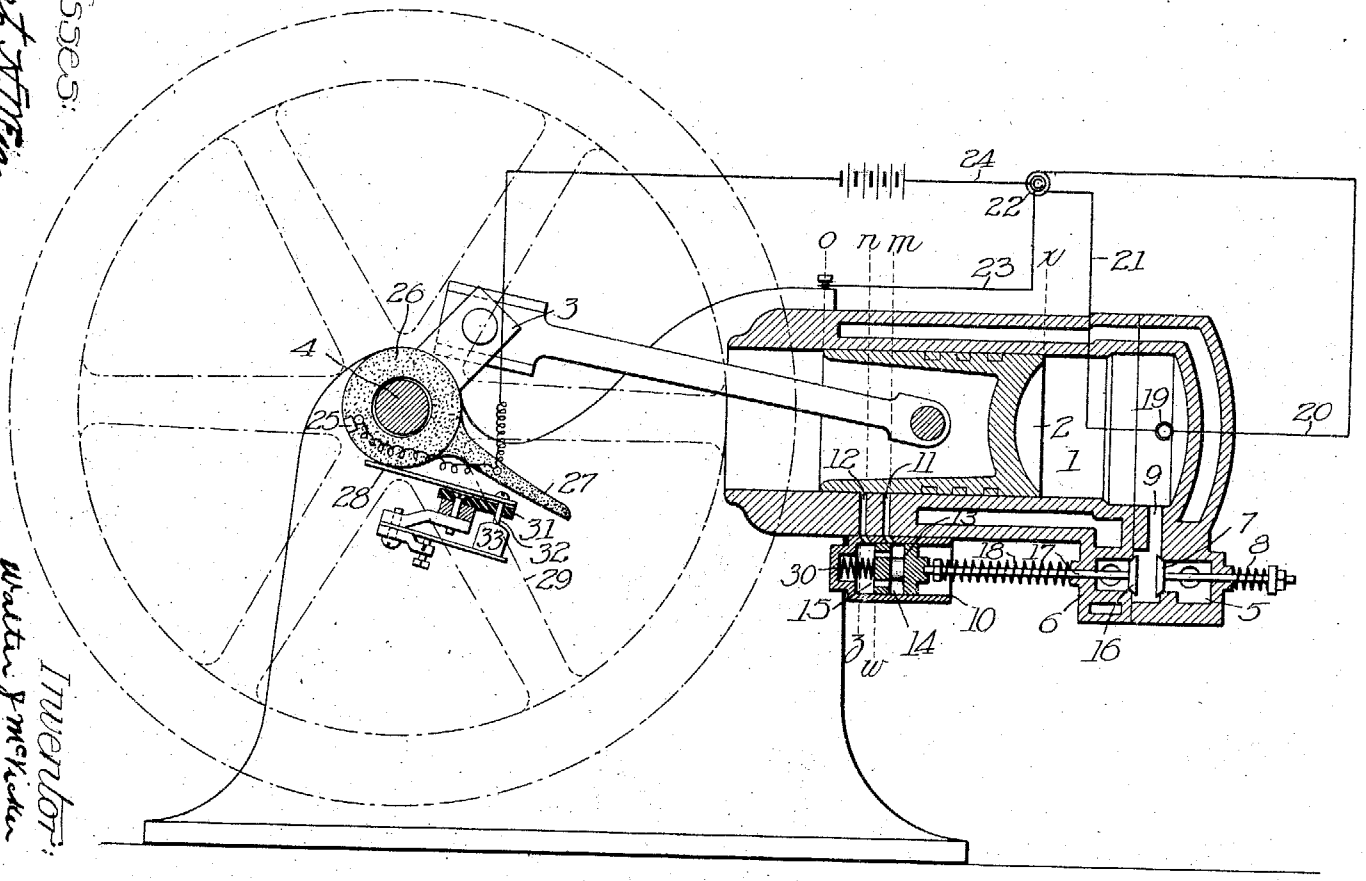
Witnesses:
Robert N. Weir
Harold G. Barnett
Inventor:
Walter J. McVicker
by Rector & Hibben
his attys

UNITED STATES PATENT OFFICE.

WALTER J. McVICKER, OF ALMA, MICHIGAN, ASSIGNOR TO ALMA MANUFACTURING COMPANY, OF ALMA, MICHIGAN.

VALVE-GEAR FOR EXPLOSIVE-ENGINES.

13,099. Specification of Reissued Letters Patent. Reissued Apr. 5, 1910.

Original No. 743,915, dated November 10, 1903, Serial No. 124,348. Application for reissue filed January 25, 1905. Serial No. 242,700.

*To all whom it may concern:*

Be it known that I, WALTER J. McVICKER, a citizen of the United States, formerly residing at Rogers, in the county of Colfax and State of Nebraska, but now residing at Alma, in the county of Gratiot and State of Michigan, have invented new and useful Improvements in Valve-Gear for Explosive-Engines, of which the following is a full, clear, and exact description.

This invention relates to improvements in gas or gasolene engines of the four-stroke cycle-compression type, the object being to provide a simple means for operating the exhaust-valve by the explosion of gas or gasolene vapor in an auxiliary cylinder containing a movable piston, thus dispensing with all gears, cams, eccentrics, &c.

I will describe a valve-gear for explosive-engines embodying my invention and then point out novel features in the appended claims.

Reference is to be had to the accompanying drawing, forming a part of this specification, in which the figure is a longitudinal section of a gas-engine embodying my invention.

Referring to the drawing, 1 designates the main cylinder, in which the main piston 2 operates, said piston having connection with a crank 3 on the driving-shaft 4. The inlet-chamber is indicated at 5 and the exhaust-chamber at 6. The inlet from the chamber 5 is controlled by a valve 7, held normally against its seat by means of a spring 8. The inlet and exhaust chambers communicate with the main cylinder through the port 9. Attached to the main cylinder is an auxiliary cylinder 10, having ports 11 and 12, communicating with the main cylinder. Operating in the auxiliary cylinder is a piston 13, having an annular port 14 and ports 15 leading therefrom to the rear side of the piston. The exhaust-valve 16 has its stem 17 loosely engaged with the piston 13, and surrounding said stem 17 is a spring 18. The spring 18 bears at one end against an abutment on the stem and at the other end against a wall of the exhaust-chamber.

From a sparking device 19 in the main cylinder wires 20 21 lead to the secondary of an induction-coil 22, and from the primary of the induction-coil a wire 23 leads to connection with the frame of the engine, and a wire 24 leads to connection with a contact-point 25, seated in a collar 26, of insulating material, arranged around the shaft 4. This collar is provided with a handle 27, by means of which it may be adjusted to cause the sparking at the desired moment. A contact-finger 28 is carried by the fly-wheel 29 and is designed at intervals to engage with the contact 25 to close the circuit and cause the spark.

The operation is as follows: As the main piston moves outward on its suction-stroke, the admission-valve 7 is opened against the resistance of the spring 8 by atmospheric pressure, and an explosive mixture is drawn into the cylinder 1. When the line $x$ of the piston 2 reaches the line $m$, it has uncovered the passage or port 11, which leads to the auxiliary cylinder and through the piston 13. As the piston 13 is detached from the valve-stem 17, it is free to move inward against the resistance of a spring 30. The said spring 30, it may be here stated, has less resistance or is weaker than the spring 8 for the admission-valve, so that when the line $x$ of the piston 2 moves from $m$ to $n$ the cylinder 10 or rather the space or chamber on the left-hand side of the piston 13 will be reduced below atmospheric pressure by the opening therefrom of the passages or ports 15 and 11, to the main cylinder, inasmuch as the main cylinder 1 is at this time (with the main piston on its suction stroke) slightly below atmospheric pressure, and the line $w$ of the piston 13 will be moved toward the line $z$ against the resistance of the spring 30 by the atmospheric pressure on the right hand side of the piston, but such piston will not be moved sufficiently to cut off communication with the port and passage 11. The main piston 2 has completed its suction stroke when its line $x$ reaches the line $n$, and the main cylinder now contains an explosive mixture of gas or vapor. At the beginning of the compression stroke of the main piston 2 the rarefaction in the main and auxiliary chambers is relieved and the spring 30 is free to exert its stress on the piston 10 to drive it toward the right, and as the main piston 2 moves from $n$ to $m$ on its compression stroke, the increased pressure of the explosive mixture and the stress of the spring 30 act to expel. As the main piston 2 moves from $n$ to $m$ on its compression stroke, it expels a portion of the explosive mixture from the cylinder 1 through the passages 15 and 11, into the auxiliary cylinder and fills it with an explosive mixture. When the piston 2 completes its compression-stroke, the explosive mixture in the cylinder is ignited by a spark from the plug 19. The expansion of the burning gas moves the main piston outward, and when its line *x* uncovers the passage 11 the burning gas in the cylinder ignites the explosive mixture in the auxiliary cylinder by coming in contact with it through the passages 11 and 15. The explosion of gas in the auxiliary cylinder now moves the piston 13 outward against the resistance of the spring 18, and thus opens the exhaust-valve. The main piston does not uncover the passage 12 on its outer stroke, and when the auxiliary piston 13 moves out the passage 15 is disconnected from the passage 11, so that the pressure is sealed in the auxiliary cylinder, and thus the exhaust-valve is held open until this pressure is relieved. The main piston 2 now moves inward on its expelling stroke, and when its line *o* reaches the line *n* it has completed its expelling stroke and uncovered the passage or port 12 which relieves the pressure in the cylinder 10 and allows the spring 18 to close the exhaust-valve 16. This pressure which is relieved or rather exhausted to atmosphere is the excess pressure, that is, pressure in excess of atmospheric pressure, resulting from the explosion which has just taken place in the supplemental or auxiliary cylinder 10. Thus one cycle of four strokes is completed. The speed is controlled by interrupting the electric current used to ignite the charge, and thus preventing an explosion, as follows: It may be here stated that the contact or brush 28 is mounted on a block 31 of insulating material and carries a contact point 32 for engaging with a block 33 in electric connection with the fly-wheel. As the contact or brush 28 is moved around the collar 26, it will come in contact with the contact 25, closing the primary to produce the spark at 19.

In case of overspeed the centrifugal force will cause the block 33, which is mounted on a spring-plate, to separate from the contact-point 32, and thus interrupt the primary current, which will prevent an explosion until the speed falls to the normal. The sparking device and governor, however, form no part of the present invention.

It will be noted that the passage 11 is only opened at the outer end of the stroke and the passage 12 is only opened at the inner end and that the piston 13 forms a valvular appliance for holding the pressure in the auxiliary cylinder.

I claim:

1. In an explosive engine, the combination, with the main cylinder and a piston therein actuated by the combustion of a charge of explosive vapor, an igniter for exploding said charge, and an exhaust valve for venting the products of combustion, of pressure-operated mechanism including an explosion chamber for opening said valve, the valve being actuated by the force of an explosion in said chamber separate from and subsequent to the explosion in the main cylinder.

2. In an explosive engine, the combination, with the main cylinder and a piston therein actuated by the combustion of a charge of explosive vapor, an igniter for exploding said charge, and an exhaust valve for venting the products of combustion, of pressure-operated mechanism for opening said valve comprising an auxiliary explosion cylinder and an auxiliary piston therein operatively connected with said valve and actuated by the force of an explosion in said chamber separate from and subsequent to the explosion in the main cylinder.

3. In an explosive engine of the four cycle type, the combination of a main cylinder having inlet and exhaust ports, a main piston operating therein, an auxiliary cylinder having its outer end constantly open to atmospheric pressure, an auxiliary piston movable therein and yieldingly spring-pressed toward said outer end of the cylinder, said cylinders being provided with port communication connecting them near the end of the outstroke of the main piston and said spring-pressed piston in the auxiliary cylinder being arranged to be moved inwardly by atmospheric pressure when so connected during a charging stroke of the main piston and moved outwardly when the rarefaction in the main cylinder is relieved, and an exhaust valve operatively connected with said auxiliary piston.

4. In an explosive engine, a main cylinder having inlet and outlet ports, a main piston operating therein, an auxiliary piston having port communication with the main cylinder, a piston operating in the auxiliary cylinder, the said piston having an annular port, and ports leading therefrom to the rear of the piston, and a valve for the exhaust having loose connection with the piston in the auxiliary cylinder and operated by the explosion of gas or vapor mixture in said auxiliary cylinder, while one of the ports is closed by the piston in the main cylinder.

5. In a gas engine, a main cylinder, a main piston operating therein, an inlet chamber and exhaust chamber, the said chambers being in port communication with the main cylinder, valves for said chambers, an auxiliary cylinder having two ports communicating with the main cylinder, one rearward of the other, a piston operating in said auxiliary cylinder and having ports in connection with the ports leading to the main cylinder while the main piston is in forward position, and the said main piston operating to cut off the communication when in rearward position, and a stem extended from the exhaust valve and having loose connection with the piston in the auxiliary cylinder.

6. In a gas engine, a main cylinder, a main piston operating therein, an inlet chamber and exhaust chamber, the said chambers communicating with the main cylinder, an inlet controlling valve, a spring for holding said valve to its seat, an exhaust valve, an auxiliary cylinder having two ports communicating with the main cylinder and adapted to be cut off by the main piston, a piston operating in the auxiliary cylinder and having ports normally communicating with the first named ports, a spring engaging with said piston and having a less resistance than the spring of the inlet controlling valve, a stem extended from the exhaust valve and having loose connection with the piston of the auxiliary cylinder, and a spring for holding said exhaust valve to its seat.

7. In an explosive engine, a main cylinder, a main piston operating therein, a spring-pressed inlet valve having port communication with said cylinder, an auxiliary cylinder, an auxiliary piston in said cylinder, a spring yieldingly pressing said piston toward the outer end of said auxiliary cylinder and having less resistance than the spring controlling the inlet valve, said main cylinder near the end of the out stroke of the main piston being in port communication with said auxiliary cylinder, and an exhaust valve operatively connected with the piston in the auxiliary chamber.

8. In an explosive engine of the four cycle type and having a main cylinder, a main piston operating therein and a spring-pressed inlet valve having port communication with said cylinder; an auxiliary cylinder; an auxiliary piston in said cylinder; a spring yieldingly pressing said piston toward the outer end of said auxiliary cylinder, said cylinders being provided with port communication uncovered by the main piston near the end of its outward stroke and the stress of said spring yielding to atmospheric pressure on the outer side of the auxiliary piston when said cylinders are in communication during the suction stroke of the main piston; an exhaust valve loosely connected with said auxiliary piston and arranged to be operated by it; and means for venting the pressure in said auxiliary cylinder at the end of the exhaust stroke of the main piston.

9. In an explosive engine of the four cycle type and having a main cylinder provided with inlet and exhaust passages and a main piston reciprocating in said cylinder; an auxiliary cylinder having two ports communicating with two corresponding ports in the main cylinder, the rearmost of said ports in the auxiliary cylinder communicating with atmosphere when its communicating port in the main cylinder is uncovered by the main piston at the end of the inward movement of such piston; an auxiliary piston in such auxiliary cylinder provided with passages and ports connecting the foremost of said two ports in the main cylinder with said auxiliary cylinder in the intermediate and inward positions of such auxiliary piston and in its outward position cutting off such communication; a spring tending to move said auxiliary piston outward in said auxiliary cylinder, said main piston near the end of its outward stroke uncovering the forward one of said two ports in the main cylinder and the stress of said spring yielding to atmospheric pressure on the outer side of the auxiliary piston when said cylinders are in communication during a suction stroke of the main piston, and an exhaust valve arranged to be operated by said auxiliary piston.

WALTER J. McVICKER.

Witnesses:
LOUIS B. ERWIN,
S. E. HIBBEN.